United States Patent
Phillips

[15] 3,694,009
[45] Sept. 26, 1972

[54] PIPE SADDLE
[72] Inventor: Robert F. Phillips, Baton Rouge, La.
[73] Assignee: Ethyl Corporation, New York, N.Y.
[22] Filed: Dec. 28, 1970
[21] Appl. No.: 102,017

[52] U.S. Cl.............................285/197, 285/DIG. 16
[51] Int. Cl................................................F16l 41/00
[58] Field of Search......................285/197, 198, 199, 200, DIG. 16; 137/318; 138/99

[56] References Cited

UNITED STATES PATENTS

| 3,272,534 | 9/1966 | Smith | 285/197 X |
| 3,298,717 | 1/1967 | Rothwell et al. | 285/197 |
| 3,355,193 | 11/1967 | Craig et al. | 285/197 |
| 1,772,568 | 8/1930 | Schlaich | 285/200 X |
| 3,489,441 | 1/1970 | Malcolm | 285/197 |
| 3,355,794 | 12/1967 | Adams | 285/197 X |
| 3,241,207 | 3/1966 | Skinner | 138/99 X |

FOREIGN PATENTS OR APPLICATIONS

| 1,049,527 | 11/1966 | Great Britain | 285/197 |
| 1,341,773 | 9/1963 | France | 137/318 |

Primary Examiner—Thomas F. Callaghan
Attorney—Donald L. Johnson, John F. Sieberth, E. Donald Mays and Arthur G. Connolly

[57] ABSTRACT

A pipe saddle for attaching service lines to large-diameter pipelines or service mains. The saddle includes a split, flexible, cylindrical strap adapted to be clamped around the pipeline. The strap provides a generally cylindrical opening therein in which is received a coupling fitting which accommodates a standard corporation stop valve for subsequent connection of the service line thereto.

5 Claims, 7 Drawing Figures 3,694,009

PIPE SADDLE

BACKGROUND OF THE INVENTION

1. Field of the Invention

This invention relates to a pipe saddle adapted for connecting service lines to pipes, in particular, plastic pipes.

2. Description of the Prior Art

Pipe saddles have been utilized heretofore for making connections to large-diameter pipe when the pipe is in normal service and carries either a liquid or a gas under pressure. However, pipe saddles used heretofore are of bulky construction and cannot be readily attached to plastic pipe. Plastic pipe, particularly polyvinyl chloride pipe, is currently being used in relatively large diameters, e.g., 6, 8, 10 and 12 inch diameters for utility service lines such as gas and water. The installation of T-fittings and taps in the large-diameter main lines for coupling up service leads to residences and businesses can considerably increase the cost of installing the line. Thus, there is a need for a lightweight, corrosion-resistant, pipe saddle clamp that can be readily attached to plastic pipelines, which may be under pressure, whereby either a dry or wet tap may be made into the pipeline for connecting a service line thereto.

SUMMARY OF THE INVENTION

It is an object of the present invention to provide a pipe saddle which may be readily attached to a pipeline under pressure.

It is also an object of the present invention to provide a pipe saddle which is lightweight and contains a minimum number of components.

It is another object of the present invention to provide a pipe saddle which can resist corrosion and have long service life.

The foregoing objects are realized in a pipe saddle which includes a split, flexible, annular, clamping band of material having two opposing end portions adapted to be coupled together. A split, resilient, annular, cushioning band of material abuts at least a substantial portion of the inner wall of the clamping band. Aligned openings are provided in the walls of the clamping and cushioning bands to receive a fitting having a shank portion projecting through the openings in the clamping band and the cushioning band. The fitting has an integrally curved flange portion at its lower end with the top wall thereof engaging the interior wall of the clamping band adjacent the opening. A resilient seal ring abuts the bottom wall of the flange portion of the fitting, and locking means are received on the upper end of the shank portion of the fitting to couple the fitting tightly to the clamping band. Coupling means to attach the end portions of the clamping band together to securely lock the saddle onto the pipe are provided.

DESCRIPTION OF THE PREFERRED EMBODIMENTS

Figure 1:
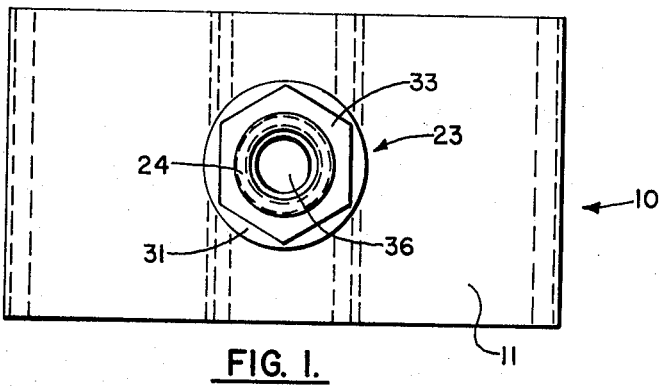
FIG. 1 is a top plan view of a pipe saddle constructed in accordance with the present invention.
Figure 2:
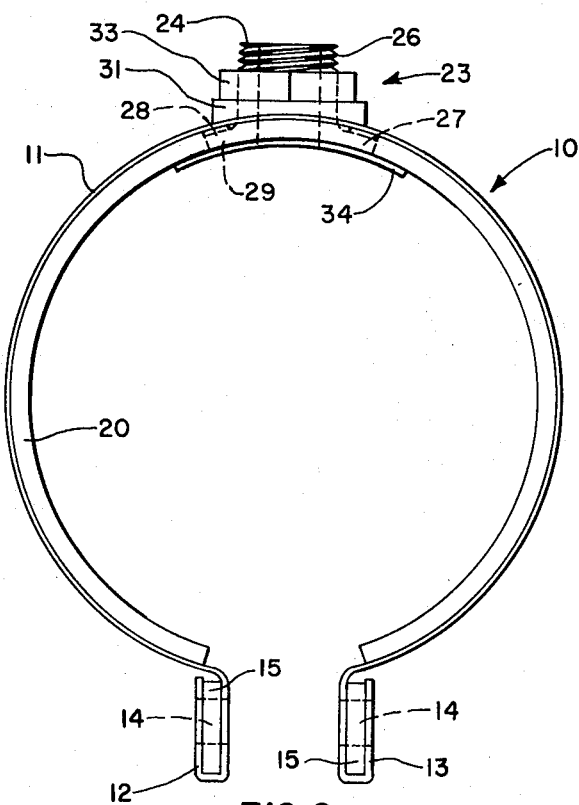
FIG. 2 is an elevational view of the pipe saddle of FIG. 1.
Figure 3:
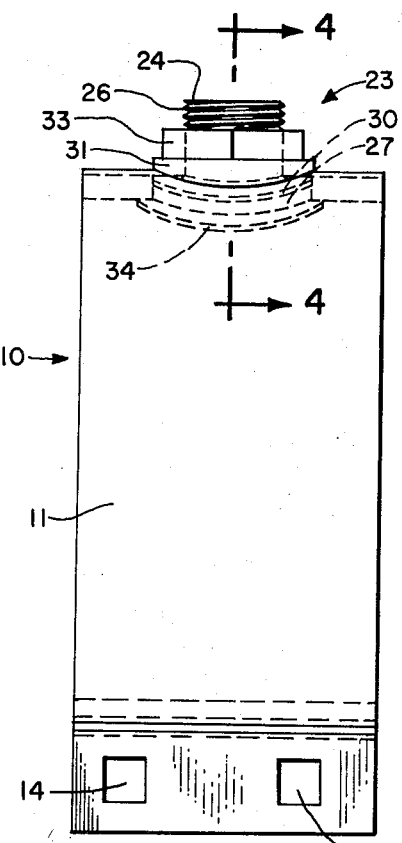
FIG. 3 is a side elevational view of the pipe saddle of FIG. 1.
Figure 4:
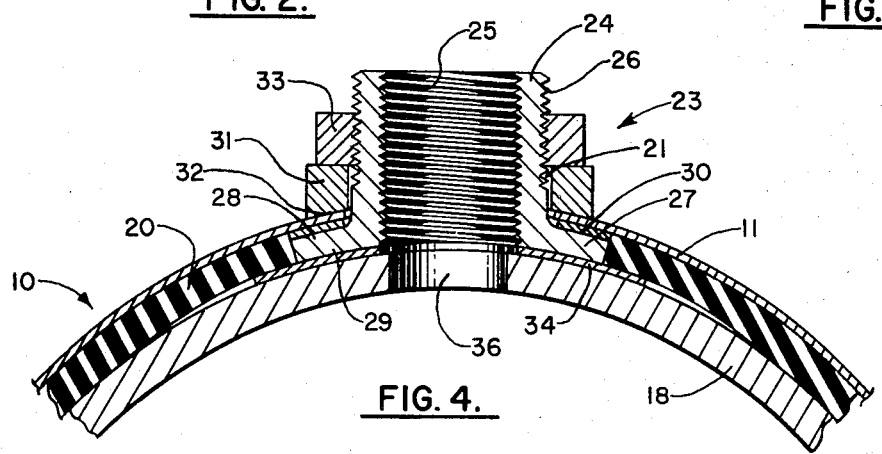
FIG. 4 is an enlarged sectional view along the line 4—4 of FIG. 3.

Referring now to FIGS. 1–5, the pipe saddle of the present invention, designated generally by the numeral 10, includes a split, flexible, generally annular, clamping band 11. This band is preferably made from a high strength metal; for example, stainless steel has been found eminently suitable for use in manufacture of the device. The end portions 12 and 13 of the clamping band are bent into a generally U-shaped configuration and each end portion is provided with opposed, spaced apart openings 14 therein. Rectangular reinforcing members 15—15 are received in the generally U-shaped end portions 12 and 13 of the clamping band to provide reinforcement thereto. The reinforcing members 15—15 each are provided with openings of the same size and in the same position as the openings 14 provided in the end portions 12 and 13 in the clamping band. Threaded bolts 16—16 are received in the matching pairs of aligned openings and nuts 17—17 are threadedly received thereon to clamp the pipe saddle tightly around the pipeline 18 (as seen in FIG. 4). While the pipe shown in FIG. 4 is sectioned for plastic, it is understood that the pipe saddle of the present invention, while designed primarily for use on plastic pipe, is equally suitable for use on metallic, Transite and other pipe. When the device is used on plastic pipe, it is desirable to provide a compressive, rectangular member 19 made from wood or resilient plastic or high density rubber for insertion between the U-shaped end portions 12 and 13 of the clamping band to prevent excessive tightening of the bolts 17—17 which might possibly split the plastic main pipeline 18. The thickness of the spacer member 19 will be selected whereby sufficient compression forces may be achieved to tightly seal the pipe saddle to the pipe, but will prevent excessive tightening of the bolts to the extent that the pipe may be damaged.

A split, resilient, annular, cushioning band 20 substantially covers the inner wall of the annular clamping band 11. It is preferred that the cushioning bank 20 be made from a highly resilient, strong material such as rubber. It is preferred that the rubber cushioning band be provided with an integral cloth backing which is adhesively attached to the inner wall of the clamping band 11. The cushioning band permits the pipe saddle to be compressively attached to the plastic pipe 18 without danger of applying too great a compression force to the pipe and yet continuously keeps the band 11 under tension whereby an effective seal is obtained.

Figure 5:
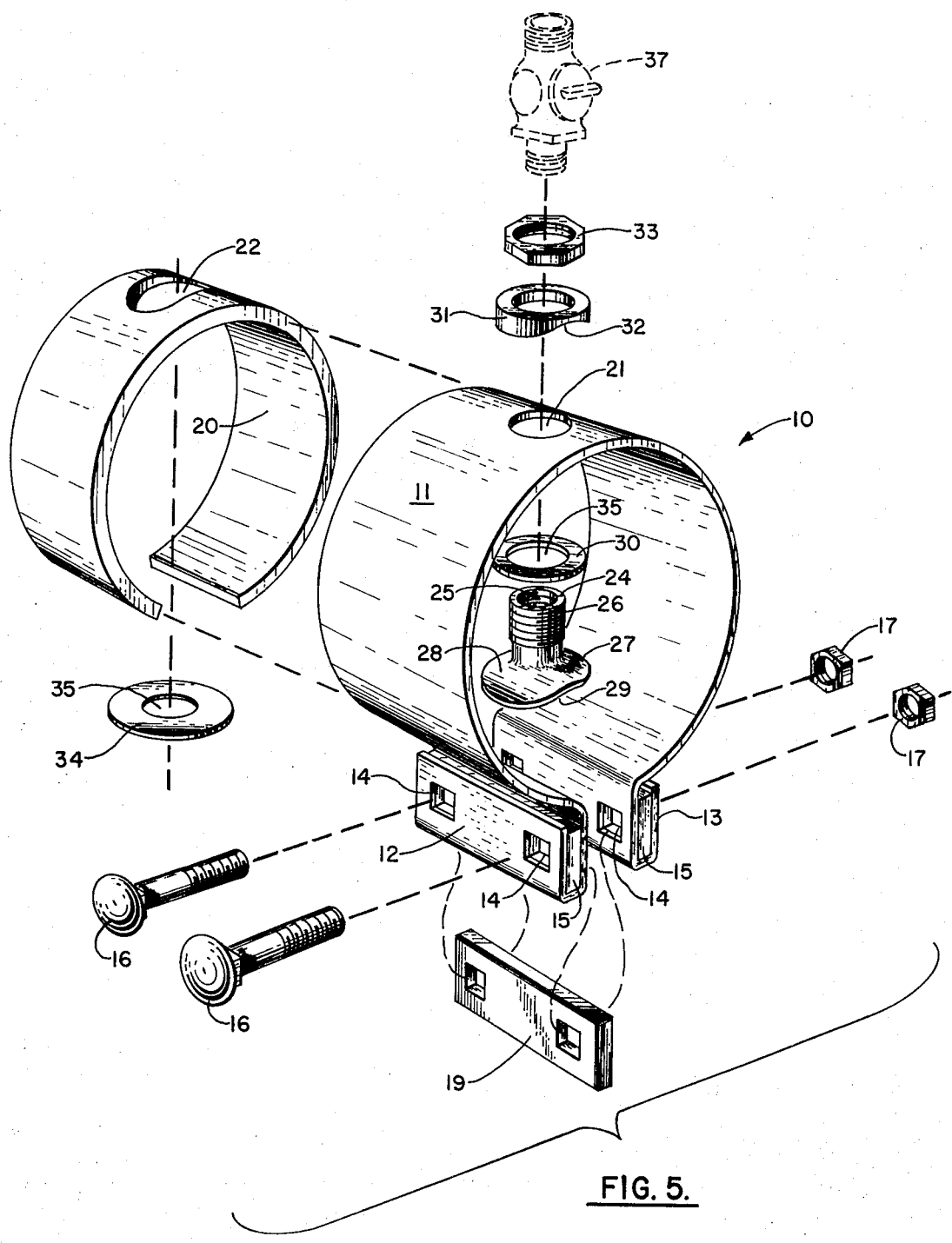
FIG. 5 is an elevational, exploded view of the pipe saddle of the present invention.
Figure 6:
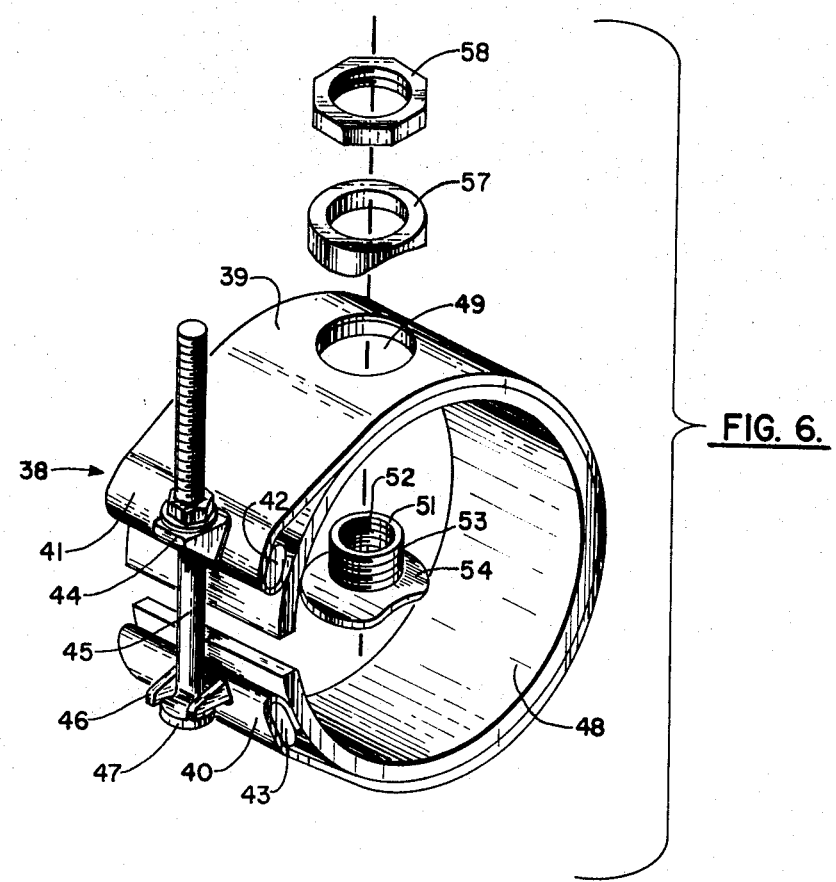
FIG. 6 is an elevational, exploded view of another embodiment of the pipe saddle of the present invention.

As seen in FIG. 5, the clamping band 11 is provided with a central, generally cylindrical opening 21 in its sidewall opposite the end portions 12 and 13 of the band. Also, the cushioning band 20 is provided with a similar opening 22 which is slightly larger in diameter than the opening 21 in the clamping band. A coupling fitting, designated generally by the numeral 23, is received in aligned openings 21 and 22 and is tightly clamped to the peripheral area surrounding the opening 21 in the clamping band. The coupling includes a generally cylindrical shank or body portion 24 which is provided with internal threads 25 and external threads 26. As can be seen more clearly in FIGS. 4 and 5, the fitting is provided with an integrally formed, curved, flange portion 27. The flange portion 27 has a top surface 28 which is generally convex and has substantially the same curvature as the clamping band 11. The flange also has a corresponding convex shaped, generally cylindrical undersurface 29. If desired, a flat, annular, flexible washer 30 may be received over the body 24 of the fitting in abutting relation with the top surface 28 of the flange portion whereby it is compressed between the underside of the clamping band 11 and the top surface 28 of the fitting flange to seal the same. However, it is not essential that this washer be provided, and the upper surface 28 of the flange may be in direct or abutting contact with the undersurface of the clamping band 11 surrounding the opening 21. Annular collar 31 is freely received over the shank or body portion 24 of the fitting and has its arcuately shaped undersurface 32 in abutting contact with the top surface of clamping band 11 adjacent the opening 21. Arcuately shaped undersurface 32 of the annular collar 31 is shaped to conform to the cylindrical surface of the clamping bank 11 whereby even pressure is applied around the opening when clamping the coupling 23 into the band 11. Nut 33 is threadedly received on exterior threads 26 of the body and has its undersurface tightly engaging the upper surface of annular collar 31 whereby the fitting 23 is locked securely into the opening 21 provided in the clamping band 11. After the fitting 23 is tightly coupled to the clamping band, a flexible, flat, annular, seal ring 34 is adhesively attached to the underside of cushioning band 20 and has its opening 35 concentrically aligned with openings 21 and 22 to provide a clear passage through the fitting 23. The seal washer 34 preferably has a diameter in excess of the opening 22 provided in the clamping band whereby contact between the peripheral edge of the washer is maintained with the clamping band 20 surrounding the opening 22 therein.

As seen in FIG. 4, when the pipe saddle 10 is tightly clamped to pipe 18, sealing washer 34 is in full contact with the upper surface of the pipe and also tightly engages the undersurface 29 of the flange in the fitting 23 to provide a leakproof seal around the opening 36 in the pipe 18, which opening may be either provided before or after the pipe saddle is attached to the pipe.

To install the pipe saddle of the present invention, the opening between the U-shaped end portions 14 and 15 of the clamping band is increased in size by flexing the band apart until the saddle will pass over the pipeline to which it is to be attached. Bolts 16 are then placed in openings 14 and nuts 17 are attached thereto with the spacer 19 being inserted between the U-shaped end portions 12 and 13 of the clamping band 11, if desired. If the pipe 18 is not in service, the opening 36 in the pipe may be drilled prior to attaching the pipe saddle 10 thereto. The pipe saddle is then positioned so that the opening in the coupling 23 is aligned with and directly over the opening 36 in the pipe, and then the bolts 16—16 and nuts 17—17 are tightened to clamp the pipe saddle securely to the pipe. If it is desired to install the saddle on a pipe which is in service, i.e., one which is under pressure and does not have a previously supplied opening, the saddle is attached in the same manner as described hereinbefore and then a corporation stop valve 37, as seen in FIG. 5 in dotted outline, is threadedly attached to the interior threads 25 of the fitting 23 and the valve placed in the off position. A wet tapping tool (not shown) is then coupled to the top of the corporation stop and the valve is opened and the tool extended through the valve 37 and through the coupling 23 to cut an opening 36 in the pipe 18 as is well known in the prior art. The tapping tool is then withdrawn through the corporation stop 37 and the valve turned off and the tool removed from the valve. A service line may then be connected to the top of corporation stop 37 and the valve opened to provide a flow of the gas or liquid carried by the pipeline to the customer.

It should be noted that the coupling fitting 23, as shown per se in FIGS. 1–5, does not form a part of this invention and is covered by application Ser. No. 31,312, filed Apr. 23, 1970, which application is owned in part by the assignee of the present invention. The disclosure of said application Ser. No. 31,312 is hereby incorporated herein by reference.

Figure 7:
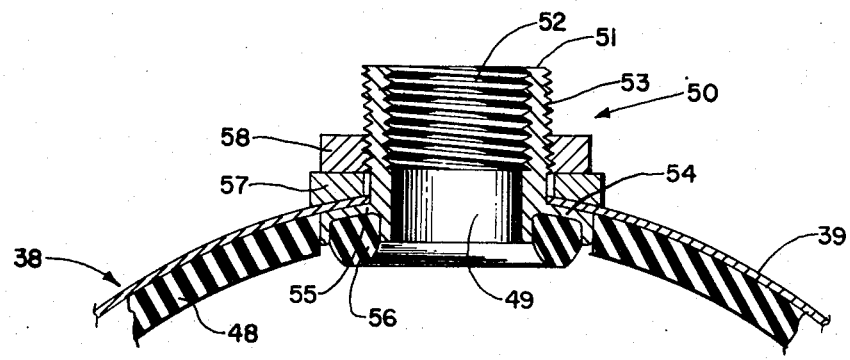
FIG. 7 is an enlarged, elevational, sectional view similar to FIG. 4 of the coupling fitting shown in FIG. 6.

Referring now to FIG. 7, a second embodiment of the pipe saddle of the present invention, designated generally by the numeral 38, is disclosed. The saddle includes a flexible, split, annular, metallic, clamping band 39. The ends 40 and 41 of the clamping band are in-turned to form a U-shaped, rectangular recess at each end. The upper, in-turned end 41 of the clamping band receives upper reinforcing member 42 therein. Likewise, the lower end 40 of the clamping band receives lower reinforcing member 43. Member 42 is provided with an integrally formed lug 44 which projects through an opening 45 provided in the sidewall of the clamping band 39 adjacent its lower end. The lug 44 is provided with an opening which receives the threaded end of bolt 45. Lower reinforcing member 43 is provided with an integrally formed, bifuricated lug 46 which receives the head 47 of bolt 45 to securely lock the clamping band tightly around the pipe. A resilient, flexible, cushioning band 48 is attached to the inner surface of the clamping band 39 and serves the same purpose as described hereinbefore in connection with the first embodiment of the pipe clamp to prevent application of too much pressure to plastic pipe. An opening is provided in clamping band 39 and cushioning band 48 on an axis which is generally perpendicular to the bolt 45 whereby the bolt may be tightened from the top of the pipe. Coupling fitting, designated generally by the numeral 50, is received in opening 49 and is tightly clamped to the clamping band 39. The fitting includes a shank or body portion 51 having internal threads 52 and external threads 53 thereon. A generally annular flange portion 54 is provided on the bottom of the fitting 50 and has a generally convex top surface which abuts the underside of clamping band 39 surrounding the opening 49. Flange 50 has a generally convex undersurface and an annular recess 55 is provided in this undersurface to receive a generally truncated, pyramidal, annular, sealing ring 56, as seen more clearly in FIG. 7. It should be noted that the truncated surface of the annular seal ring 56 projects a substantial distance below the clamping band 48 in order that it may make firm contact with the pipe and may be placed under compressive force sufficient to effect a liquidproof seal with the pipe when clamping forces are applied to the pipe saddle. The pyramidal seal ring 56 is preferred over the flat washer 34 when high pressures (100 –500 psi) are encountered. Coupling 50 also includes the annular collar 57 similar to the collar 31 described hereinbefore, and the nut 58 similar to the nut 33 described hereinbefore. The fittings 23 and 50 are preferably made from brass, but may be made from galvanized iron or plastic, if desired.

While the preferred materials have been described hereinbefore, it is understood that the clamping band of the present invention may be made from any combination of materials which are suitable for the intended purpose.

While there has been described what is at present preferred embodiments of the present invention, it will be apparent to those skilled in the art that various modifications and changes may be made without departing from the essence of the invention. It is intended to cover herein all such modifications and changes as come within the true scope and spirit of the claims.

What is claimed is:

1. A pipe saddle comprising:
   a. a split, flexible, annular clamping band of material having two opposing end portions adapted to be coupled together;
   b. a split, resilient, annular cushioning band of material abutting at least a substantial portion of the inner wall of said clamping band;
   c. aligned openings being provided in the walls of said clamping and said cushioning bands, the opening in said cushioning band being larger than the opening in said clamping band;
   d. a fitting having a shank portion projecting through said aligned openings and an integral, curved flange portion which is received within said opening in said cushioning band with its top wall engaging the interior wall of said clamping band adjacent said opening;
   e. a resilient seal ring abutting the bottom wall of said flange portion of said fitting;
   f. locking means received on the upper end of the shank portion of said fitting to couple said fitting tightly to said clamping band; and
   g. means to couple said end portions of said clamping band together to securely lock said saddle on said pipe.

2. In the pipe saddle of claim 1 wherein said locking means includes a spacer received over the shank portion of said fitting and a locking nut threadedly received on the shank portion and abutting the top surface of said spacer.

3. In the pipe saddle of claim 1 wherein said opposed end portions are provided with reinforcing means and said coupling means includes at least one bolt and nut.

4. In the pipe saddle of claim 1 wherein said resilient seal ring comprises a flat washer of thin, flexible material.

5. In the pipe saddle of claim 1 wherein said resilient seal ring comprises an annular ring fixed to the lower surface of said curved flange portion of said fitting, said ring projecting partially over said opening in said cushioning band.

* * * * *